United States Patent
Takigawa et al.

[11] Patent Number: 5,900,141
[45] Date of Patent: May 4, 1999

[54] WATER PURIFIER HAVING ACCUMULATING MEANS ARRANGED TO PREVENT BACKWARD WATER FLOW

[75] Inventors: Satoshi Takigawa, Konosu; Toshiya Chiku, Isesaki, both of Japan

[73] Assignee: Sanden Corporation, Japan

[21] Appl. No.: 08/816,382

[22] Filed: Mar. 13, 1997

[30] Foreign Application Priority Data

Mar. 13, 1996 [JP] Japan .................................. 8-056195

[51] Int. Cl.$^6$ .......................... B01D 17/12; E03B 11/00; C02F 1/46
[52] U.S. Cl. ....................... 210/104; 137/393; 137/488; 210/110; 210/121; 210/243; 210/257.1
[58] Field of Search ............................. 210/85, 90, 96.2, 210/97, 110, 121, 123, 134, 136, 143, 257.1, 257.2, 269, 436, 472, 670, 792, 104, 107, 109, 175, 243, 94, 195.2, 258; 502/20, 56; 137/391, 393, 395–399, 488

[56] References Cited

U.S. PATENT DOCUMENTS

| | | |
|---|---|---|
| 3,730,885 | 5/1973 | Makrides et al. . |
| 4,160,727 | 7/1979 | Harris .................................. 210/257.2 |
| 4,801,375 | 1/1989 | Padilla ................................. 210/257.2 |
| 4,969,991 | 11/1990 | Valadez .................................. 210/258 |
| 5,108,590 | 4/1992 | Disanto ................................. 210/195.2 |
| 5,254,243 | 10/1993 | Carr et al. ............................... 210/94 |
| 5,494,573 | 2/1996 | Schoenmeyr et al. ..................... 210/94 |

FOREIGN PATENT DOCUMENTS 2659869 9/1991 France .................................. 210/670

*Primary Examiner*—Joseph W. Drodge
*Attorney, Agent, or Firm*—Banner & Witcoff, Ltd.

[57] ABSTRACT

A water purifier generally associated with a beverage dispenser is disclosed. The water purifier includes a first conduit having a first end and a second end opposite to the first end, a second conduit having a first end and a second end opposite to the first end, a cistern disposed between the first and second conduits, and a water purifying device disposed in the flow path of either the first conduit or the second conduit. The first end of the first conduit is arranged to conduct water to be purified into the first conduit, and the second end of the second conduit is arranged to conduct the purified water from the second conduit to a location outside of the water purifier. The flow of the water from the second conduit to the first conduit is completely prevented and interrupted whenever the water attempts to flow from the second end of the second conduit to the first end of the first conduit through the arrangement of the second end of the first conduit and the cistern.

17 Claims, 1 Drawing Sheet

WATER PURIFIER HAVING ACCUMULATING MEANS ARRANGED TO PREVENT BACKWARD WATER FLOW

BACKGROUND OF THE INVENTION

1. Technical Field of the Invention

This invention generally relates to a water purifier, and more particularly, to a water purifier for a beverage dispenser or other beverage serving apparatus.

2. Description of the Prior Art

In general, a beverage dispenser is connected to a faucet of a water pipe so as to conduct treated water suitable for drinking, for example, a chlorinated water, from the water pipe through a pipe member and to the beverage dispenser.

Since it is demanded that the water which will be conducted into the beverage dispenser be clear and harmless, it is required to remove detrimental substances, such as for example, trihalomethane ($CHX_3$) and offensive odor substances, such as for example, 2-MIB, and minute particles, such as for example, Fe system substances coming off from an inner wall of the water pipe, from the water which will be conducted into the beverage dispenser Accordingly, it is preferable to dispose a water purifier within the pipe member which links the faucet of the water pipe to the beverage dispenser.

However, conventional water purifiers may allow water to flow from the beverage dispenser to the water pipe. Therefore, pollutants, such as for example, the germs which are unexpectedly propagated at the beverage dispenser, may be unintentionally conducted to the water pipe through the pipe member together with the water when it erroneously flows from the beverage dispenser to the water pipe.

SUMMARY OF THE INVENTION

Accordingly, it is an object of the present invention to provide a water purifier which can completely interrupt or prevent the flow of water therethrough whenever the water may erroneously flow backwardly through the water purifier.

According to the present invention, an apparatus for processing water includes a first conduit having a first end and a second end opposite to the first end, a second conduit having a first end and a second end opposite to the first end, and a water processing mechanism, for example, a water purifying device.

The water purifying device is disposed in either the first conduit between the first and second ends thereof or the second conduit between the first and second ends thereof. The first end of the first conduit is arranged to conduct an object water to be processed into the first conduit. The second end of the second conduit is arranged to conduct the water processed by the water purifying device to a location outside of the apparatus.

The water processing apparatus further comprises a prevention mechanism for preventing or interrupting the flow of the water from the second conduit to the first conduit at a time when the water may flow from the second end of the second conduit to the first end of the first conduit. The prevention mechanism comprises an accumulating device, such as a cistern for temporarily accumulating the water from the first conduit at a water level between a first boundary water level and a second boundary water level which is higher than the first boundary water level. The first conduit and the cistern are arranged such that the second end of the first conduit is located at a position above the second boundary water level, and the second conduit and the cistern are arranged such that the first end of the second conduit is connected to a bottom portion of the cistern.

BRIEF DESCRIPTION OF THE DRAWINGS

The novel features of the present invention are set out with particularity in the appended claims, but the invention will be understood more fully and clearly from the following detailed description of the invention as set forth in the accompanying drawings, in which:

DETAILED DESCRIPTION OF THE PREFERRED EMBODIMENTS

Figure 1:
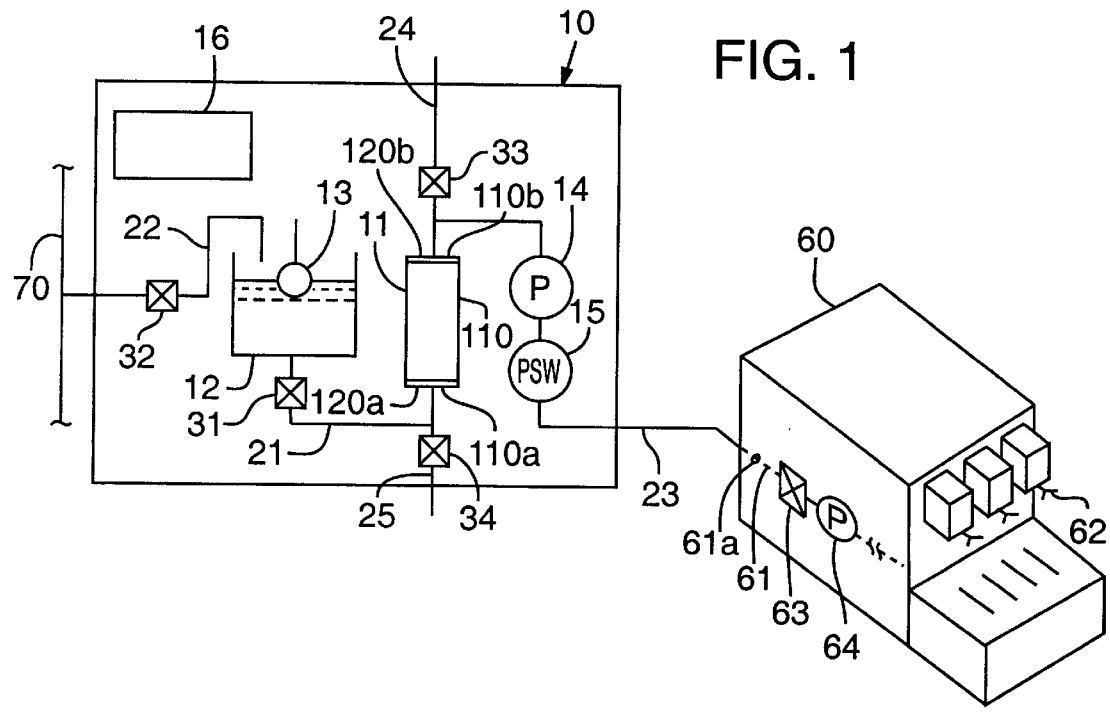
FIG. 1 is a block diagram of a water purifier in accordance with a first embodiment of the present invention.

Referring to FIG. 1 illustrating a block diagram of a water purifier in accordance with a first embodiment of the present invention, the water purifier 10 includes a reactivatable water purifying device 11 and an accumulating device such as a cistern 12 for temporarily accumulating water therein.

The water purifying device 11 includes a container 110 which contains a purifying member (not shown) therewithin. The purifying member comprises active carbon particles (not shown) functioning as both adsorbing and filtrating elements. The container 110 has first and second ends 110*a* and 110*b* opposite to each other. The water purifying device 11 is oriented such that the first end 110*a* is lower than the second end 110*b* when it is installed. A pair of electrodes 120*a* and 120*b* are fixedly disposed at the first and second ends 110*a* and 110*b* of the container 110, respectively so as to face each other while the water is properly flowing through the container 110.

The cistern 12 is linked to the container 110 of the purifying device 11 in fluid communication through a first pipe member 21. One end of the first pipe member 21 is fixedly connected to a bottom of the cistern 12, and the other end is fixedly connected to the first end 110*a* of the container 110. A first valve element 31, for example, a first electromagnetic valve having a normally closed contact (not shown) is disposed within the first pipe member 21. A float switch 13 operatively floats on the surface of the water in cistern 12. The float switch 13 is turned on when the level of the water in cistern 12 decreases to a first boundary position, and is turned off when the level of the water in the cistern 12 increases to a second boundary position which is higher than the first boundary position.

A second pipe member 22 is disposed between the cistern 12 and a water pipe 70 which is conducting therethrough a treated water that is suitable for drinking, for example, chlorinated city water. One end of the second pipe member 22 is releasably connected to a faucet (not shown) of the water pipe 70, and the other end is located within an inner hollow space of the cistern 12 at a position above the above-mentioned second boundary position. A second valve element 32, for example, a second electromagnetic valve is disposed within the second pipe member 22.

A third pipe member 23 is disposed between the container 110 of the purifying device 11 and a beverage serving apparatus 60, for example, a coffee brewing apparatus or a tea server. One end of the third pipe member 23 is releasably connected to an inlet port 61*a* of a water conducting pipe 61 (a part of which is illustrated in FIG. 1) equipped in the beverage serving apparatus 60, and the other end is fixedly connected to the second end 110*b* of the container 110. A pump 14 and a water flow detecting element 15, for example, a pressure detector, are disposed within the third pipe member 23 in series. The location of the pump 14 is chosen such that it is closer than the pressure detector 15 to the container 110 of the purifying device 11.

A plurality of beverage selecting levers 62 are operatively disposed at a front end surface (to the right in FIG. 1) of the beverage serving apparatus 60. The levers 62 are operatively connected to a single valve element, for example, an electromagnetic valve 63 having a normally closed contact (not shown), such that the electromagnetic valve 63 is energized and deenergized in response to the movement of the levers 62. The electromagnetic valve 63 is disposed within the water conducting pipe 61 of the beverage serving apparatus 60. A pump 64 is also disposed within the water conducting pipe 61, and is positioned to be farther than the electromagnetic valve 63 from the inlet port 61a of the water conducting pipe 61.

A fourth pipe member 24 functioning as an air outlet pipe is connected at one end thereof to the third pipe member 23 at a location between the pump 14 and the second end 110b of the container 110 of the purifying device 11. The other end of the fourth pipe member 24 is open to the atmosphere. A third valve element 33, for example, a third electromagnetic valve, is disposed within the fourth pipe member 24.

A fifth pipe member 25 functioning as a water outlet pipe is connected at one end thereof to the first pipe member 21 at a location between the first end 110a of the container 110 of the purifying device 11 and the first valve element 31. The other end of the fifth pipe member 25 is open to the atmosphere. A fourth valve element 34, for example, a fourth electromagnetic valve, is disposed within the fifth pipe member 25.

The first through fourth electromagnetic valves 31–34, the float switch 13, the pump 14 and the pressure detector 15 are electrically connected to a control device 16 so as to be controlled independently.

In operation of the water purifier 10 of the first embodiment, as the beverage serving apparatus 60 is required to serve one of the kinds of beverages selected therefrom, the corresponding selecting lever 62 of the beverage serving apparatus 60 is pushed rearwardly (to the left in FIG. 1), and the electromagnetic valve 63 is energized to an open position, and simultaneously, the pump 64 begins to operate. As a result, the water in the third pipe member 23 that has already flowed past the pump 14 is conducted through the water conducting pipe 61, past the electromagnetic valve 63 and the pump 64 to a decocting portion (not shown) of the beverage serving apparatus 60. At this moment, flow of the water from the cistern 12 to the third pipe member 23, prior to the pump 14, is blocked because the control device 16 prevents the pump 14 from operating and prevents the first electromagnetic valve 31 from being energized. As the water in the third pipe member 23, after the pump 14, is continually conducted to the water conducting pipe 61 of the beverage serving apparatus 60, the pressure of the water in the third pipe member 23, after the pump 14, gradually decreases.

When the pressure of the water in the third pipe member 23, after the pump 14, decreases to a first predetermined value, the pressure detector 15 is turned on, and generates a first electrical signal $S_1$ which is continually sent to the control device 16. Once the control device 16 receives the first electrical signal $S_1$, the control device 16 signals to start the operation of the pump 14 and simultaneously to energize the first electromagnetic valve 31 to an open position. As a result, the water in the cistern 12 begins to be conducted to the water conducting pipe 61 of the beverage serving apparatus 60 as it flows through the first pipe member 21, the purifying device 11 and the third pipe member 23 by virtue of operation of the pump 14.

In this stage, the water from the cistern 12 as an object water flows into the container 110 of the purifying device 11 through the first end 110a of the container 110, and moves upwardly through the container 110 so as to be purified therewithin by virtue of both the adsorbing and filtrating operations. The water purified within the container 110 of the purifying device 11 flows out from the container 110 through the second end 110b, and is conducted through the third pipe member 23 to the water conducting pipe 61 of the beverage serving apparatus 60 as a processed water.

The adsorbing and filtrating operations at the purifying device 11 are described in detail below. In the adsorbing operation, detrimental substances, such as for example, trihalomethane ($CHX_3$,) and offensive odor substances, such as for example, 2-MIB are adsorbed by the active carbon particles (not shown). However, in this operation, Cl system germicidal substances, such as for example, ClO and $Cl_2$, are also adsorbed by the active carbon particles (not shown). In the filtrating operation, the minute particles, such as for example, Fe system substances coming off from an inner wall of the water pipe 70 that are suspended in the water therein, are filtrated with the active carbon particles (not shown).

As the water continues to be conducted from the cistern 12 to the beverage serving apparatus 60, the level of the water in the cistern 12 decreases. When the level of the water in the cistern 12 decreases to the aforementioned first boundary position, the float switch 13 is turned on, and it generates a second electrical signal $S_2$ which is continually sent to the control device 16. Once the control device 16 receives the second electrical signal $S_2$, the control device 16 signals to energize the second electromagnetic valve 32 to an open position. As a result, the drinkable water, for example, the city water flowing through the water pipe 70, begins to be conducted to the cistern 12 through the second pipe member 22.

As the conduction of the city water from the water pipe 70 to the cistern 12 continues, the level of the water in the cistern 12 gradually increases. When the level of the water in the cistern 12 increases to the aforementioned second boundary position, the float switch 13 is turned off, and the generation of the second electrical signal $S_2$ is terminated, so that the second electrical signal $S_2$ is no longer sent to the control device 16. Once the control device 16 does not receive second electrical signal $S_2$, the control device 16 signals to deenergize the second electromagnetic valve 32 to a closed position. As a result, the flow of the city water being conducted from the water pipe 70 to the cistern 12 is terminated.

As long as the first electromagnetic valve 31 is open, the above-mentioned operations of the second electromagnetic valve 32 are repeated, so that the level of the water in the cistern 12 is maintained at a position which is located between the aforementioned first and second boundary positions.

When the service of the beverage from the beverage serving apparatus 60 is completed, the corresponding selecting lever 62 is moved forwardly (to the right in FIG. 1), so that electromagnetic valve 63 is deenergized a closed position, and simultaneously, the operation of the pump 64 is terminated. As a result, the flow of the water in the third pipe member 23 to the decocting portion (not shown) of the beverage serving apparatus 60 is stopped.

At this moment, the flow of the water from the cistern 12 to the third pipe member 23 by virtue of operation of the pump 14 still continues because the first electrical signal $S_1$ is still sent to the control device 16. As a result, the pressure of the water in the third pipe member 23 gradually increases.

When the pressure of the water in the third pipe member 23 increases to a second predetermined value which is greater than the aforementioned first predetermined value by a certain amount, the pressure detector 15 is turned off, and the generation of the first electrical signal $S_1$ is terminated so that the first electrical signal $S_1$ is no longer sent to the control device 16. Once the control device 16 does not receive the first electrical signal $S_1$, the control device 16 signals to stop the operation of the pump 14 and simultaneously to deenergize the first electromagnetic valve 31 to a closed position. As a result, the flow of the water from the cistern 12 to the third pipe member 23 is stopped. Accordingly, the flow of the water from the cistern 12 to the container 110 of the purifying device 11 is stopped, so that the operation of purifying the water at the purifying device 11 is terminated.

Furthermore, regardless of whether the operation of the purifying device 11 is carried out, when the water purifying device 11 is determined to need to be reactivated, a reactivating operation of the water purifying device is carried out according to the following manner.

First, the control device 16 signals to open the third and fourth electromagnetic valves 33 and 34 while the first electromagnetic valve 31 is closed. Consequently, an inner space of the container 110 becomes in fluid communication with the atmosphere through the fourth and fifth pipe members 24 and 25. As a result, the water temporarily maintained in the container 110 is discharged therefrom. The water flows through the first end 110a of the container 110, past the fourth electromagnetic valve 34, and is discharged through the fifth pipe member 25 by virtue of its own gravity. At the same time, the air outside container 110 is conducted thereinto through the fourth pipe member 24 as it flows past the third electromagnetic valve 33 and through the second end 110b of the container 110. Accordingly, the water flows backwardly through the container 110 as compared with the flow of water through the container 110 during a normal operation of the water purifier 10. Due to this backward and downward flow of the water, the substances, such as for example, the Fe system substances coming off from the inner wall of the water pipe 70 are separated from the active carbon particles, and then the substances move downwardly in the container 110 together with the water. Finally, the water is discharged from the container 110 together with the above-mentioned filtrated substances through the fifth pipe member 25, through the first end 110a of the container 110, and past the fourth electromagnetic valve 34.

When the discharge of the water from the container 110 is completed, the control device 16 produces a signal such that an electric potential is loaded on the pair of electrodes 120a and 120b so as to pass the electricity through the active carbon articles (not shown) in the container 110 in a predetermined time period. As a result, the active carbon particles (not shown) are heated to about 100° C. by means of a Joule effect. When the active carbon articles (not shown) are heated, the detrimental substances, such as for example, trihalomethane ($CHX_3$,) and the offensive odor substances, such as for example, 2-MIB are de-adsorbed from the active carbon particles (not shown). In this operational stage, Cl system germicidal substances, such as for example, ClO, and $Cl_2$ are also de-adsorbed from the active carbon particles (not shown).

The detrimental substances, such as for example, trihalomethane ($CHX_3$), the offensive odor substances, such as for example, 2-MIB and the Cl system germicidal substances, such as for example, ClO and $Cl_2$ that are de-adsorbed from the active carbon particles (not shown) are discharged from the container 110 through the fifth pipe member 25 together with the small water droplets which stayed on the active carbon articles (not shown) in the container 110. As the operation of heating the active carbon articles (not shown) continues, after completion of the discharge of the water from the container 110 to the atmosphere, the active carbon particles (not shown) and the inner surface of the container 110 are sterilized and dried.

When the operational stage of heating the active carbon particles (not shown) by means of a Joule effect is completed, the control device 16 signals to open the first and third electromagnetic valves 31 and 33 while the fourth electromagnetic valve 34 is closed. Consequently, the fluid communication of the inner space of the container 110 with the atmosphere through the fourth pipe member 24 is still open while a fluid communication between the cistern 12 and the container 110 of the water purifying device 11 through the first pipe member 21 also becomes open. As a result, the water in the cistern 12 is conducted into the container 110 through the first pipe member 21, past the first electromagnetic valve 31 and the first end 110a of the container 110. As the conduction of the water into the container 110 from the cistern 12 continues, the water level of the container 110 moves toward the second end 110b of the container 110, i.e., the water level of the container 110 moves upwardly while discharging the air in the container 110 to the atmosphere through the fourth pipe member 24, past the second end 110b of the container 110 and the third electromagnetic valve 33. After a time when the water level of the container 110 reaches the second end 110b of the container 110, the control device 16 signals the first electromagnetic valve 31 to remain open, the fourth electromagnetic valve 34 to remain closed, and the third electromagnetic valve element 33 to also close. Thus, the reactivating operation of the water purifying device 11 is completed, and the water purifier 10 becomes on standby for operation thereof.

Furthermore, the reactivating operation of the water purifying device 11 may be arranged by the control device 16 to be periodically carried out in predetermined constant time intervals.

Moreover, the reactivating operation of the water purifying device 11 may be arranged so as to be carried out at a time when the number of times the second valve element 32 has opened reaches a predetermined value.

According to the first embodiment of the present invention, the second pipe member 22 and the cistern 12 are arranged such that the other end of the second pipe member 22 is located within the inner hollow space of the cistern 12 at a position above the second boundary position, i.e., the set highest water level. As a result, the flow of the water from the cistern 12 to the water pipe 70 is prevented and is not possible at any time. Accordingly, pollutants, such as for example, the germs which are unexpectedly propagated at the beverage serving apparatus 60 are never conducted to the water pipe 70 through the third, first and second pipe members 23, 21 and 22 together with the water at a time when the water may erroneously attempt to flow from the beverage serving apparatus 60 to the water pipe 70.

Figure 2:
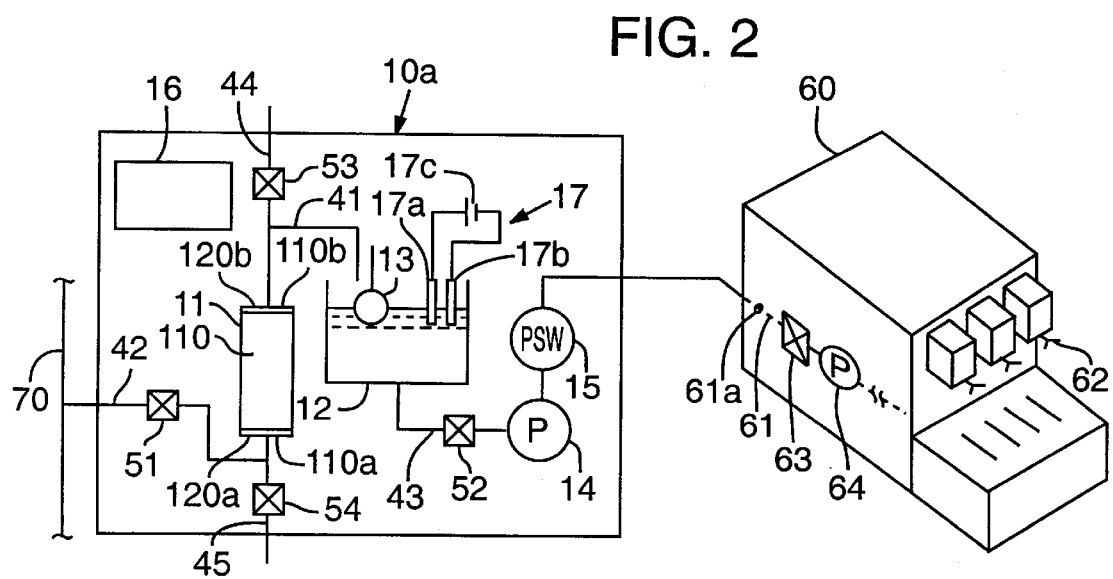
FIG. 2 is a block diagram of a water purifier in accordance with a second embodiment of the present invention.

FIG. 2 illustrates a block diagram of a water purifier in accordance with a second embodiment of the present invention. In the drawing, the same numerals are used to denote the corresponding elements shown in FIG. 1 so that an explanation thereof is omitted.

With reference to FIG. 2, the water purifier 10a includes a water purifying device 11 and a cup-shaped cistern 12 for temporarily accumulating water which has passed through the water purifying device 11.

A first pipe member 41 is disposed between the cistern 12 and the container 110 of the water purifying device 11. One end of the first pipe member 41 is fixedly connected to the second end 110b of the container 110 of the water purifying device 11, and the other end is located within an inner hollow space of the cistern 12 at a position above a later-mentioned second boundary position, i.e., the set highest water level.

A second pipe member 42 is disposed between the container 110 of the water purifying device 11 and the water pipe 70 which is conducting therethrough a treated water suitable for drinking, for example, a chlorinated city water. One end of the second pipe member 42 is releasably connected to a faucet (not shown) of the water pipe 70, and the other end is linked to the first end 110a of the container 110. A first valve element 51, for example, a first electromagnetic valve is disposed within the second pipe member 42.

A third pipe member 43 is disposed between the cistern 12 and beverage serving apparatus 60. One end of the third pipe member 43 is releasably connected to an inlet port 61a of a water conducting pipe 61 (a part of which is illustrated in FIG. 2) equipped in the beverage serving apparatus 60, and the other end is fixedly connected to a bottom portion of the cistern 12. A second valve element 52, for example, second electromagnetic valve having a normally closed contact (not shown) is disposed within the third pipe member 43. Pump 14 and water flow detecting element, for example, pressure detector 15 are also disposed within the third pipe member 43 between the second valve 52 and the inlet port 61a of the water conducting pipe 61 in series. The location of the pump 14 is selected so that it is closer than the pressure detector 15 to the second valve 52. One end of fourth pipe member 44 is connected to an interim portion of the first pipe member 41. The other end of the fourth pipe member 44 is open to the atmosphere. A third valve element 53, for example, a third electromagnetic valve is disposed within the fourth pipe member 44. One end of fifth pipe member 45 is connected to the second pipe member 42 at a location between the first end 110a of the container 110 of the water purifying device 11 and the first valve 51. The other end of the fifth pipe member 45 is open to the atmosphere. A fourth valve element, for example, a fourth electromagnetic valve 54 is disposed within the fifth pipe member 45. A pair of electrodes 120a and 120b are fixedly disposed at the first and second ends 110a and 110b of the container 110, respectively so as to face each other. An electric potential is loaded onto the pair of electrodes 120a and 120b so as to pass an electric current through active carbon articles (not shown) in the container 110 in a predetermined time period, when the water purifying device 11 is required to be reactivated.

A float switch 13 operatively floats on the surface of the water in cistern 12. The float switch 13 is turned on when the level of the water in cistern 12 decreases to a first boundary position, and is turned off when the level of the water in the cistern 12 increases to a second boundary position which is higher than the first boundary position.

An electrolytic device 17 having positive and negative electrodes 17a and 17b is associated with the cistern 12 such that the electrodes 17a and 17b are maintained in an immersed condition in the water in the cistern 12 even when the level of the water in cistern 12 decreases to the first boundary position. A battery 17c is connected to the positive and negative electrodes 17a and 17b so as to load an electric potential thereto, so that a directive electric current passes through the water in the cistern 12. An operation of the electrolytic device 17 is intermittently carried out in response to demand.

The first through fourth valves 51–54, the float switch 13, the pump 14, the pressure detector 15 and the electrolytic device 17 are electrically connected to a control device 16 so as to be controlled independently.

In operation of the water purifier 10a of the second embodiment, as the beverage serving apparatus 60 is required to serve one of the kinds of beverages therefrom, the corresponding selecting lever 62 of the beverage serving apparatus 60 is pushed rearwardly (to the left in FIG. 2) and the electromagnetic valve 63 is energized to an open position, and simultaneously, the pump 64 begins to operate. As a result, the water in the third pipe member 43, after the pump 14, is conducted to a decocting portion (not shown) of the beverage serving apparatus 60 through the water conducting pipe 61, past the electromagnetic valve 63 and the pump 64. At this moment, flow of the water from the cistern 12 to the third pipe member 43, before the pump 14, is blocked because the control device 16 signals the pump 14 not to operate and the second electromagnetic valve 52 is closed. As the water in the third pipe member 43, after the pump 14, is continually conducted to the water conducting pipe 61 of the beverage serving apparatus 60, the pressure of the water disposed in the third pipe member 53, after the pump 14, gradually decreases.

When the pressure of the water in the third pipe member 53, after the pump 14, decreases to a first predetermined value, the pressure detector 15 is turned on, and generates a first electrical signal $S_1$ which is continually sent to the control device 16. Once the control device 16 receives the first electrical signal $S_1$, the control device 16 signals to start operation of the pump 14 and simultaneously to energize the second electromagnetic valve 52 to an open position. As a result, the water in the cistern 12 begins to be conducted to the water conducting pipe 61 of the beverage serving apparatus 60, through the third pipe member 43, past the second electromagnetic valve 52, the pump 14 and the pressure detector 15 by virtue of operation of the pump 14.

As the water continues to be conducted from the cistern 12 to the beverage serving apparatus 60, the level of the water in the cistern 12 decreases. When the level of the water in the cistern 12 decreases to the first boundary position, the float switch 13 is turned on and it generates a second electrical signal $S_2$ which is continually sent to the control device 16. Once the control device 16 receives the second electrical signal $S_2$, the control device 16 signals to energize the first electromagnetic valve 51 to an open position. As a result, the drinkable water, for example, the city water flowing through the water pipe 70, begins to be conducted to the cistern 12 through the second and first pipe members 42 and 41, past the first electromagnetic valve 51 and the water purifying device 11.

When the water from the water pipe 70 as an object water flows through the container 110 of the purifying device 11, from the first end 110a to the second end 110b of the purifying device 11, the water is purified by virtue of both the adsorbing and filtrating operations occurring therein. The water purified within the container 110 of the purifying device 11 flows out from the container 110 through the second end 110b, and is conducted to the cistern 12 through the first pipe member 41 as a processed water. The adsorbing and filtrating operations at the purifying device 11 have been already described in detail in the first embodiment, so that an explanation thereof is omitted.

As the city water continues to be conducted from the water pipe 70 to the cistern 12, the level of the water in the cistern 12 gradually increases. When the level of the water in the cistern 12 increases to the second boundary position, which is higher than the aforementioned first boundary position, the float switch 13 is turned off, and the generation of the second electrical signal $S_2$ is terminated, so that the second electrical signal $S_2$ is no longer sent to the control device 16. Once the control device 16 does not receive second electrical signal $S_2$, the control device 16 signals to deenergize the first electromagnetic valve 51 to a closed position. As a result, the conduction of the city water from the water pipe 70 to the cistern 12 past the water purifying device 11 is terminated.

As long as the second electromagnetic valve 52 is open, the above-mentioned operations of the first electromagnetic valve 51 are repeated, so that the level of the water in the cistern 12 is maintained at a position which is located between the aforementioned first and second boundary positions.

When the service of the beverage from the beverage serving apparatus 60 is completed, the corresponding selecting lever 62 is moved forwardly (to the right in FIG. 2), so that the electromagnetic valve 63 is deenergized to a closed position, and simultaneously, the operation of the pump 64 is terminated. As a result, the flow of the water in the third pipe member 43 to the decocting portion (not shown) of the beverage serving apparatus 60 is stopped.

At this moment, the flow of the water from the cistern 12 to the third pipe member 43 by virtue of operation of the pump 14 still continues because the first electrical signal $S_1$ is still being sent to the control device 16 by the pressure detector 15. As a result, the pressure of the water in the third pipe member 43 gradually increases.

When the pressure of the water in the third pipe member 43 increases to a second predetermined value which is greater than the aforementioned first predetermined value by a certain amount, the pressure detector 15 is turned off, and the generation of the first electrical signal $S_1$ is terminated, so that the first electrical signal $S_1$ is no longer sent to the control device 16. Once the control device 16 does not receive the first electrical signal $S_1$, the control device 16 stops the operation of the pump 14 and simultaneously deenergizes the second electromagnetic valve 52 to a closed position. As a result, the flow of the water from the cistern 12 to the third pipe member 43 is stopped.

According to the second embodiment, the first pipe member 41 and the cistern 12 are arranged such that the other end of the first pipe member 41 is located within the inner hollow space of the cistern 12 at a position above the second boundary position, i.e., the set highest water level. As a result, the flow of the water from the cistern 12 to the water purifying device 11 is prevented and is not possible at any time. Accordingly, pollutants, such as for example, the germs which are unexpectedly propagated at the beverage serving apparatus 60 are never conducted to the water pipe 70 through the third, first and second pipe members 43, 41 and 42 together with the water when the water may erroneously attempt to flow from the beverage serving apparatus 60 to the water pipe 70.

The above-mentioned operation of the electrolytic device 17 is carried out according to the following manner. When the electrolytic device 17 is required to electrolyze the water in the cistern 12, the control device 16 signals for electric potential to be loaded onto the positive and negative electrodes 17a and 17b by the battery 17c. As a result, the water in the cistern 12, into which chlorine ions ($Cl^-$) are electrolytically dissolved, is electrolyzed according to the formulas (1) and (2) depicted below.

  (1)

  (2)

Therefore, even though the $Cl^-$ system germicidal substances, such as for example, ClO and $Cl_2$ have been already adsorbed by the active carbon particles (not shown) at the water purifying device 11, the water flowing from the water purifying device 11 and then accumulated in the cistern 12 can be effectively and sufficiently sterilized by $Cl_2$ and $ClO^-$, which are produced by electrolyzation at the cistern 12 in response to demand. Accordingly, the water flowing from the water purifying device 11 and then temporarily accumulated in the cistern 12 is hygienically conducted to the beverage serving apparatus 60 at any time when the water is required to be conducted from this cistern 12 to the beverage serving apparatus 60.

The other effects and the functional operations of the water purifier 10a of the second embodiment are substantially similar to those of the first embodiment, so that an explanation thereof is omitted.

This invention has been described in connection with the preferred embodiments. These embodiments, however, are merely for example only and the invention is not restricted thereto. It will be understood by those skilled in the art that variations and modifications can easily be made within the scope of this invention as defined by the appended claims.

We claim:

1. An apparatus for processing water comprising:

a first conduit having a first end and a second end opposite to the first end; a second conduit having a first end and a second end opposite to the first end;

means for processing water being disposed in at least one of said first conduit and said second conduit between said respective first and second ends thereof, said first end of said first conduit being arranged to conduct water to be processed into said first conduit, said second end of said second conduit being arranged to conduct water processed by said water processing means to a location outside of said apparatus;

prevention means for selectively preventing a flow of the water from the second conduit to the first conduit, said prevention means including an accumulating means for temporarily accumulating water from said first conduit at a water level between a first boundary water level and a second boundary water level, said second boundary water level being higher than said first boundary water level, and said first conduit and said accumulating means being arranged such that said second end of said first conduit is located at a position above said second boundary water level, and said second conduit and said accumulating means are arranged such that said accumulating means is connected to said first end of said second conduit at a position lower than said first boundary water level and further comprising detecting means responsive to a pressure condition in said second conduit for determining whether the processed water is required to be conducted to said location and regulating means for regulating the water being conducted through said first conduit and/or said second conduit in response to a detecting result of said detecting means.

2. The apparatus of claim 1 wherein said accumulating means includes a cistern.

3. The apparatus of claim 2 wherein said accumulating means further includes a float switch operatively floating on a surface of the water in said cistern.

4. The apparatus of claim 2 wherein said first end of said second conduit is connected to a bottom portion of said cistern.

5. The apparatus of claim 1 wherein said water processing means is disposed in a flow path of said second conduit between said first and second ends thereof.

6. The apparatus of claim 5 wherein the detecting means is operable for detecting whether the processed water is required to be conducted to said location through said second end of said second conduit and said regulating means is operable for regulating water being conducted into said first end of said first conduit and/or said first end of said second conduit.

7. The apparatus of claim 6 wherein said regulating means operates to close said first end of said second conduit at a time when said detecting means detects that the water processed by said processing means is not required to be conducted to the location outside of said apparatus through said second end of said second conduit.

8. The apparatus of claim 7 wherein said detecting means is a pressure detector for detecting whether the processed water is required to be conducted to the location outside of said apparatus through said second conduit, said pressure detector disposed in said second conduit adjacent to said second end thereof, and said regulating means is an electromagnetic valve disposed in said second conduit adjacent to said first end thereof.

9. The apparatus of claim 1 wherein said water processing means is disposed in a flow path of said first conduit between said first and second ends thereof.

10. The apparatus of claim 9 wherein the detecting means is operable for detecting whether the processed water is required to be conducted to said location through said second end of said second conduit and said regulating means is operable for regulating water being conducted into said first end of said first conduit and/or said first end of said second conduit.

11. The apparatus of claim 10 wherein said regulating means operates to close said first end of said first conduit at a time when said detecting means detects that the water processed by said processing means is not required to be conducted to the location outside of said apparatus through said second end of said second conduit.

12. The apparatus of claim 11 wherein said detecting means is a pressure detector disposed in said second conduit adjacent to said second end thereof, and said regulating means is an electromagnetic valve disposed in said first conduit adjacent to said first end thereof.

13. The apparatus of claim 9 further comprising an electrolytic device associated with said accumulating means so as to electrolyze said water in said accumulating means in response to demand.

14. The apparatus of claim 1 wherein said water processing means comprises a reactivable water purifying device, and said preventing means includes detecting means including a pressure detector for detecting whether the processed water is required to be conducted to the location outside of said apparatus through said second conduit.

15. The apparatus of claim 14 wherein said water purifying device comprises a container and a plurality of active carbon particles operatively contained in said container.

16. The apparatus of claim 15 wherein said water purifying device comprises an electric potential loading means for loading an electric potential to said active carbon particles and thereby heat said particles in response to demand.

17. The apparatus of claim 16 wherein water purifying device further includes first and second pipes arranged such that said first pipe conducts the water from said container and said second pipe conducts air from the container during a time when an operation of reactivating said water purifying device is carried out.

* * * * *